(12) United States Patent
Schmitt et al.

(10) Patent No.: US 7,875,855 B2
(45) Date of Patent: Jan. 25, 2011

(54) APPARATUS AND METHOD FOR DETECTING AN IMAGE

(75) Inventors: Peter Schmitt, Erlangen (DE); Guenther Kostka, Erlangen (DE); Rolf Behrendt, Dormitz (DE); Matthias Kube, Fuerth (DE); Wolfgang Groeger, Roettenbach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 12/827,191

(22) Filed: Jun. 30, 2010

(65) Prior Publication Data

US 2010/0277593 A1 Nov. 4, 2010

Related U.S. Application Data

(63) Continuation of application No. 12/367,301, filed on Feb. 6, 2009, now Pat. No. 7,772,561, which is a continuation of application No. PCT/EP2009/000669, filed on Feb. 2, 2009.

(30) Foreign Application Priority Data

Feb. 6, 2008 (DE) ........................ 10 2008 007 595

(51) Int. Cl.
*G01T 7/00* (2006.01)

(52) U.S. Cl. ................................................. 250/370.09
(58) Field of Classification Search ............ 250/370.01, 250/370.08, 370.09, 370.1, 370.11; 378/70, 378/84, 85, 145, 147, 149, 154
See application file for complete search history.

(56) References Cited

U.S. PATENT DOCUMENTS 5,059,800 A * 10/1991 Cueman et al. ............. 250/367
6,495,845 B1 * 12/2002 Tsunota et al. ........... 250/505.1
7,231,017 B2 * 6/2007 Gertsenshteyn et al. ....... 378/87

OTHER PUBLICATIONS

Schmitt et al.; "Apparatus and Method for Detecting am Image"; U.S. Appl. No. 12/367,301, filed Feb. 6, 2009.

* cited by examiner

*Primary Examiner*—David P Porta
*Assistant Examiner*—David S Baker
(74) *Attorney, Agent, or Firm*—Keating & Bennett, LLP (57) ABSTRACT

In order to detect an image generated by an image source, a mirror arrangement is arranged between the image source and a detector. The mirror arrangement includes two spaced-apart deflection mirrors, which are parallel to each other or form an acute angle of less than 90° between them. In particular when the image source is a scintillator layer, shielding of X-rays from the detector with simultaneous compact dimensioning of the apparatus is achieved in this manner.

24 Claims, 5 Drawing Sheets

APPARATUS AND METHOD FOR DETECTING AN IMAGE

CROSS-REFERENCE TO RELATED APPLICATIONS

This application claims priority from German Patent Application No. 102008007595.7-51, which was filed on Feb. 6, 2008, and from International Patent Application No. PCT/EP2009/000669, which was filed on Feb. 2, 2009, which are both incorporated herein in their entirety by reference.

The present invention relates to image detection and, in particular, to image detection of scintillator screens.

BACKGROUND OF THE INVENTION

Optical pickup of a planar image source, for example a screen, which may be implemented as a scintillator screen, may be performed using one or more cameras. Such a pickup of a screen is achieved, for example, by an X-ray camera which may be employed in digital radioscopy, for example for product quality control.

In medical radioscopy, so-called flat-panel detectors are currently used. In such flat-panel detectors, X-radiation is typically converted to visible light via a scintillator screen, and said visible light is then identified via a semiconductor layer arranged directly behind the scintillator screen in the beam direction and usually consisting of amorphous silicon, and is converted to an image. The efficiency of a scintillator screen depends, among other things, on the adjusted energy of the X-ray quanta. The higher the energy of the X-radiation, the fewer X-ray quanta will be absorbed in the scintillator and will contribute to the image. The non-absorbed X-ray quanta may be absorbed by the underlying semiconductor layer, thereby damaging same. Given an appropriate dose, this radiation damage will eventually cause the detector to fail.

The field of medicine also uses detectors wherein the X-radiation is initially converted to visible light by a scintillator, too. However, said visible light is subsequently imaged in an optical manner, e.g. onto CCD cameras.

German patent DE 10301941 B4 shows a camera for optically picking up a screen, the screen comprising an area, and a predetermined overall resolution being envisaged for the optical pickup, comprising a camera support having an array of camera mounts, an array of individual optical cameras, each individual optical camera being fixedly attached to an associated camera mount, an individual optical camera comprising a light sensor and an optics imaging means, the light sensor and the optics imaging means being operative to pick up a subarea of the screen area at an individual resolution higher than the overall resolution, and comprising an image processing means for processing individual digital images of the array of individual optical cameras so as to generate the optical pickup of the screen at a predetermined overall resolution, the image processing means being operative to subject the individual digital images to a correction so as to reduce alignment inaccuracies and/or parameter variations in the array of individual optical cameras, a correction specification being used, for the correction, which is intended for an individual image with a calibration, and the correction taking place at a correction resolution which is higher than the predetermined overall resolution and is lower than or equal to the individual resolution so as to obtain corrected individual images or a corrected overall image, and to combine adjacent pixels of the corrected individual images and to then compose the images, or to combine adjacent pixels of the corrected overall image in order to obtain the optical pickup having the predetermined overall resolution.

Figure 6:
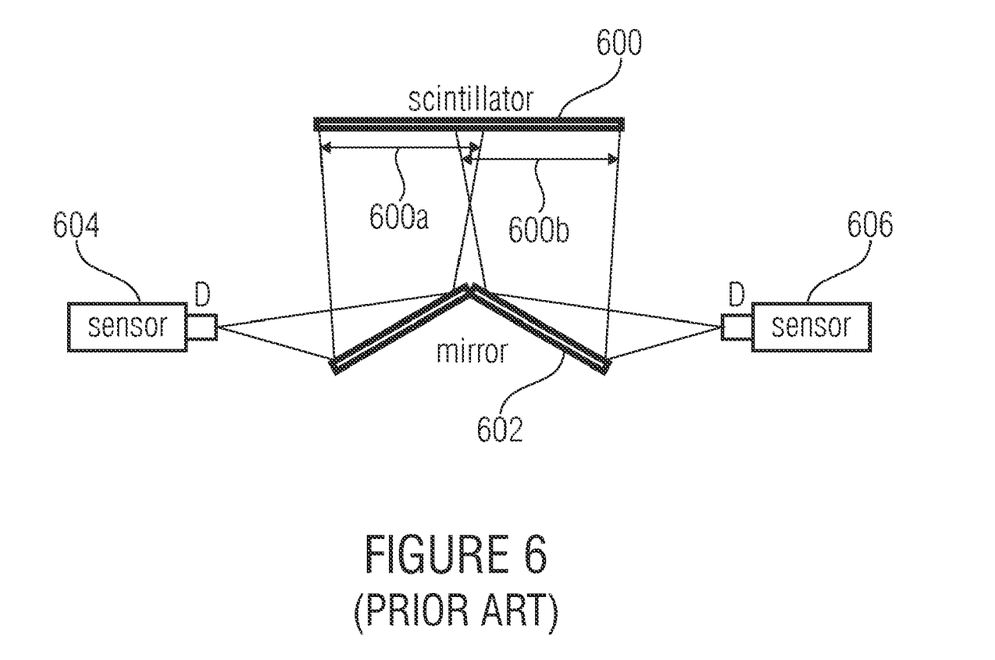
FIG. 6 shows a known arrangement of an X-ray camera having a V-shaped mirror arrangement and laterally mounted light sensors.

EP 0862748 A1 describes an arrangement wherein the visible light emanating from a scintillator is laterally deflected via a V-shaped mirror arrangement. This lateral deflection results in that the optical light path behind the mirror is essentially parallel to the scintillator screen. Because of this, radiation-sensitive cameras may be arranged outside the X-ray path, and radiation damage may be avoided at the same time. Such an arrangement is shown in FIG. 6, for example. In particular, there is a scintillator 600, opposite which the V-shaped mirror arrangement 602 is arranged. The mirror arrangement 602 deflects the light received by the scintillator 600. Two sensors 604, 606 are located within the light path of the deflected radiation, the sensor 604 imaging a first subregion 600a, whereas the second sensor 606 images a second subregion 600b of the scintillator screen. The lateral arrangement of the sensors 604, 606 additionally enables reduced structural height of the arrangement, so that this arrangement may be integrated into conventional film cartridges.

Figure 5:
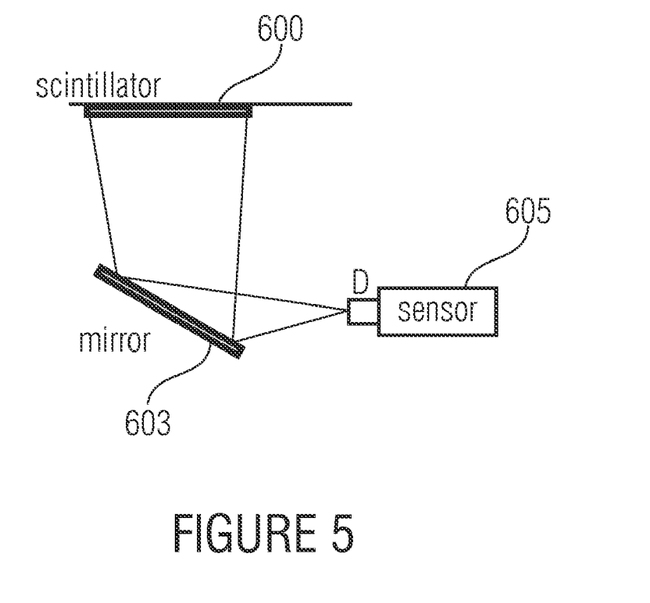
FIG. 5 shows a basic arrangement of an X-ray camera having a sensor laterally to the scintillator.

A further alternative to the arrangement shown in FIG. 6 is depicted in FIG. 5. Here, only a single mirror 603 is arranged, which images the entire scintillator 600 on a single sensor camera 605. In this case, too, the sensor 605 is arranged laterally in relation to the scintillator.

What is disadvantageous about the concept depicted in FIGS. 5 and 6 is that the structural height perpendicular to the scintillator screen is reduced since the sensors are arranged laterally. But the lateral arrangement of the sensors has the disadvantage, in turn, that the lateral dimension of the X-ray camera increases considerably. For example, in the concept shown in FIG. 6 the structural size of the X-ray camera is no longer determined by the scintillator screen 600, but by the space that may be taken up by the two sensor cameras 604, 606 and by the minimum distance of the two sensor cameras 604, 606 from the V-shaped mirror 602 so that the optical imaging conditions are achieved. As compared to the implementation wherein the semiconductor layer is arranged directly behind the scintillator screen, the length of the X-ray camera therefore increases considerably.

SUMMARY

According to an embodiment, an apparatus for detecting an image, may have: an image source; a mirror arrangement for deflecting radiation which may be generated by the image source; and a detector for receiving radiation deflected by the mirror arrangement, the mirror arrangement including: a first mirror arranged to reflect the radiation generated by the image source; a second mirror arranged to reflect radiation reflected by the first mirror, the first mirror and the second mirror being spaced apart from one another and being parallel to one another or forming an angle of less than 90° between them, and a third mirror and a fourth mirror, the first mirror being arranged to reflect only such radiation to a sensitive detector region which comes from a first subregion of the image source, the third mirror being arranged to reflect only such radiation to a sensitive detector region which comes from a second subregion of the image source, the first subregion differing from the second subregion, the fourth mirror) being arranged to reflect radiation reflected by the third mirror, the third mirror being arranged on a rear side of the second mirror, and an X-ray absorber material being arranged between the second mirror and the third mirror, or the second mirror and the third mirror being configured on different sides of a support material absorbing X-rays.

According to another embodiment, a method of detecting an image may have the steps of: emitting a radiation which represents an image; deflecting the radiation using a mirror arrangement so as to acquire deflected radiation; and detecting the deflected radiation so as to acquire the image, during deflecting, the radiation being reflected by a first mirror, and the radiation reflected by the first mirror being deflected by a second mirror, the first mirror and the second mirror being spaced apart from each other and being parallel to each other or forming an angle of less than 90° between them, and the mirror arrangement further including: a third mirror and a fourth mirror, the first mirror being arranged to reflect only such radiation to a sensitive detector region which comes from a first subregion of the image source, the third mirror being arranged to reflect only such radiation to a sensitive detector region which comes from a second subregion (505) of the image source, the first subregion (502) differing from the second subregion (505), the fourth mirror being arranged to reflect radiation reflected by the third mirror, the third mirror being arranged on a rear side of the second mirror, and an X-ray absorber material being arranged between the second mirror and the third mirror, or the second mirror and the third mirror being configured on different sides of a support material absorbing X-rays.

According to another embodiment, a method of manufacturing an apparatus including an image source, a mirror arrangement for deflecting radiation which may be generated by the image source, and a detector for receiving radiation deflected by the mirror arrangement, may have the steps of: arranging a first mirror to reflect radiation emitted by the image source; and arranging a second mirror to reflect radiation reflected by the first mirror, and arranging a third mirror and a fourth mirror, the first mirror being arranged to reflect only such radiation onto a sensitive detector region which comes from a first subregion of the image source, the third mirror being arranged to reflect only such radiation onto a sensitive detector region which comes from a second subregion of the image source, the first subregion differing from the second subregion, the fourth mirror being arranged to reflect radiation reflected by the third mirror, the third mirror being arranged on a rear side of the second mirror, and arranging an X-ray absorber material between the second mirror and the third mirror, or configuring the second mirror and the third mirror on different sides of a support material absorbing X-rays.

The apparatus for detecting an image comprises an image source, a mirror arrangement for deflecting radiation which may be generated by the image source, and a detector for picking up radiation deflected by the mirror arrangement, the mirror arrangement comprising a first mirror arranged to reflect the radiation generated by the image source, and a second mirror arranged to reflect radiation reflected by the first mirror, the first and second mirrors being spaced apart from each other and being parallel to each other or forming an angle smaller than 90°.

In particular when the image source is planar and is implemented as a scintillator, and when the apparatus for detecting is implemented as an X-ray camera, two dimensions, i.e. the length and width, of the outer size of the X-ray camera will roughly correspond to the length and width of the scintillator in order to achieve a compact implementation. However, the depth will be determined by the mirror arrangement and the detector. With regard to its length and width, the scintillator represents an essential element of a pickup device. If the scintillator is larger, i.e. longer and/or wider, a larger camera will also be accepted. If the scintillator becomes smaller, however, i.e. narrower and shorter, the size of the camera should also decrease. In order to achieve that the size of the camera is determined, with regard to two dimensions, essentially by the size of the scintillator screen with regard to the two dimensions, the detector is arranged, in accordance with the present invention, opposite an image source and advantageously even within the light path of the image source.

However, to provide decoupling of the detector from the image source for the event that the image source is a scintillator and that X-rays exist which are detrimental to the detector, a mirror arrangement is placed between the detector and the image source, said mirror arrangement being configured to deflect any radiation output by the image source, and to project it onto the detector.

Preferably the image source is a planar image source which in one embodiment may have a flat or curved (e.g. cylindrical) area emitting the radiation to be detected. By way of example only, the image source is described as a scintillator. Other image sources, such as mirrors or monitors of any kind, may also be employed as the image source. In these cases, too, it is advantageous for the camera size to be specified, in two dimensions, i.e. in the length and width, by the size of the image source with regard to these dimensions.

In particular, the mirror arrangement comprises a first mirror configured to reflect any light emitted by the planar image source. The mirror arrangement further comprises a second mirror arranged to again reflect the light reflected by the first mirror. The first and second mirrors are spaced apart from each other and are arranged in parallel with or at an acute angle relative to each other.

In this manner, any radiation, such as X-radiation, which is not deflected by the mirrors impinges on a mirror and is already attenuated by the mirror without requiring further measures for shielding off.

For example, the mirror arrangement is configured to shield at least some X-radiation, which penetrates a scintillator layer, from the detector, such that X-radiation passing through the scintillator layer cannot arrive directly at the detector, but passes through the first mirror and the second mirror and is at least weakened in the process, such that the detector is protected from X-radiation by the mirror arrangement. Preferably, the mirror arrangement is configured to shield at least 30% (e.g. for hard radiation) or advantageously even 80% (e.g. for soft radiation) of the radiation impinging on the mirror arrangement from the sensitive optical detector. Depending on the energy of the X-radiation, shielding should be performed to a greater or lesser degree. Very hard, i.e. high-energy, radiation of a high frequency is less critical to the optical detector (detector optics and photosensitive sensor), due to the low absorption, than is soft radiation, i.e. radiation having lower energy and shorter wavelength. However, softer radiation is easier to shield off, so that an optimum design of the mirror arrangement may be found for each case of application (in particular with regard to frequency). Sometimes, even a mirror glass, perhaps comprising a relatively large thickness, and a shielding glass at the optics of the detector may suffice, and in other cases, classic shielding materials such as lead or bismuth materials may indeed be used.

For applications where the X-radiation energy is not particularly strong, this may already suffice to ensure that a sensitive detector will not receive too large a radiation dose. However, if relatively high radiation energy is used, the mirrors may be specifically configured to provide a shield for X-rays, shielding materials for X-rays being lead or tungsten, for example.

Unlike mirrors which may consist of a coated pane of glass, such "shielded-off" mirrors are such mirrors which may consist of a coated disk (e.g. pane of glass) which is applied to a shielding material which differs from the disk, or pane, and has a higher X-ray shielding effect than the disk or pane. Alternatively, such a shielded-off mirror may also be a mirror wherein a surface of a material, which already shields well, is processed so as to act as an optical mirror. Such a well-shielding material is lead or tungsten or any other material having a better X-ray shielding property than glass, when two disks of material which have the same thickness are compared.

Sandwich-like inclusion of the mirror arrangement between the detector and the planar image source results in a system which is compact, simple to manufacture and, thus, efficient even in terms of production cost. The entire arrangement of the X-ray camera may therefore be designed, using the scintillator and the light emitted by the scintillator, such that a compact object is obtained, the size of which scales with the size of the scintillator and, therefore, with the inherent quality feature.

The concept of using at least two mirrors within the mirror arrangement is particularly suitable for subregion-wise imaging of a scintillator, which is may be used when the scintillator is particularly large.

Subdivision of the scintillator into subregions, which are deflected by various mirrors and are directed to a specific detector camera, is readily achieved by simply adding further pairs of mirrors. Simply joining together further pairs of mirrors enables having a camera concept for various scintillator sizes which may be readily translated, without any need for entirely new designs, to larger and smaller scintillators. The modular structure may be advantageously used simply in that further pairs of mirrors and, thus, corresponding further detector cameras are employed. In the direction, which is orthogonal thereto, of the two-dimensional scintillator, a simple modular structure is also possible, since detector cameras may readily be arranged side by side with each other so as to detect subregions of the deflecting mirrors. A large scintillator screen may therefore be imaged using an array of detector cameras, wherein each detector camera finally images a subregion of the scintillator screen. Alternatively or additionally, it is also possible to arrange several relatively small mirrors side by side with one another, so that a detector will fully record one small mirror, but each small mirror deflects only the light radiation of a subregion of the image source. It is also possible to arrange several relatively large mirrors side by side with one another, so that a detector camera will detect, for example, only a subregion of a mirror, and such that a mirror nevertheless does not deflect the light of the entire image source, but only light of a subregion which, however, is larger than the subregion which will be finally detected by a detector camera.

Preferably, two mirrors are arranged back to back, it being possible for the two mirrors to already consist of a material which shields well, as was described above, or the mirrors being disposed on the front side and back side, respectively, of such an absorbing material, so that, as a result, the absorbing material differs from a mirror support material such as pane of glass of a classic mirror, for example.

These individual images may then be composed using a computer, it being advantageous to ensure that the subregions will overlap so as to prevent any image losses, that is non-picked-up locations of the scintillator screen, from occurring even with relatively small misalignments.

The present invention therefore enables subdividing the scintillator screen into basically any number of optical cameras in a simple manner. Without changing the structural depth, a scintillator area having any size may be imaged to a correspondingly large number of optical cameras. In addition, the size, or the dimensions, of the X-ray camera is very similar, with regard to two dimensions, to the size of the scintillator screen with regard to these two dimensions, which cannot be achieved by laterally arranging the optical cameras.

In advantageous embodiments, a specific area of the scintillator screen is imaged onto each camera, respectively, the areas only slightly overlapping so as to be able to represent, following corresponding correction, the entire scintillator area.

The present invention therefore enables a modular architecture, so that any size and shape of a scintillator may be imaged by adding further modules in the form of further pairs of mirrors or in the form of detector cameras which detect different regions of one and the same deflection mirror. In this manner, an X-ray camera may be built which is adapted to the size and shape of the device under test on which the size and shape of the scintillator screen eventually depend.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
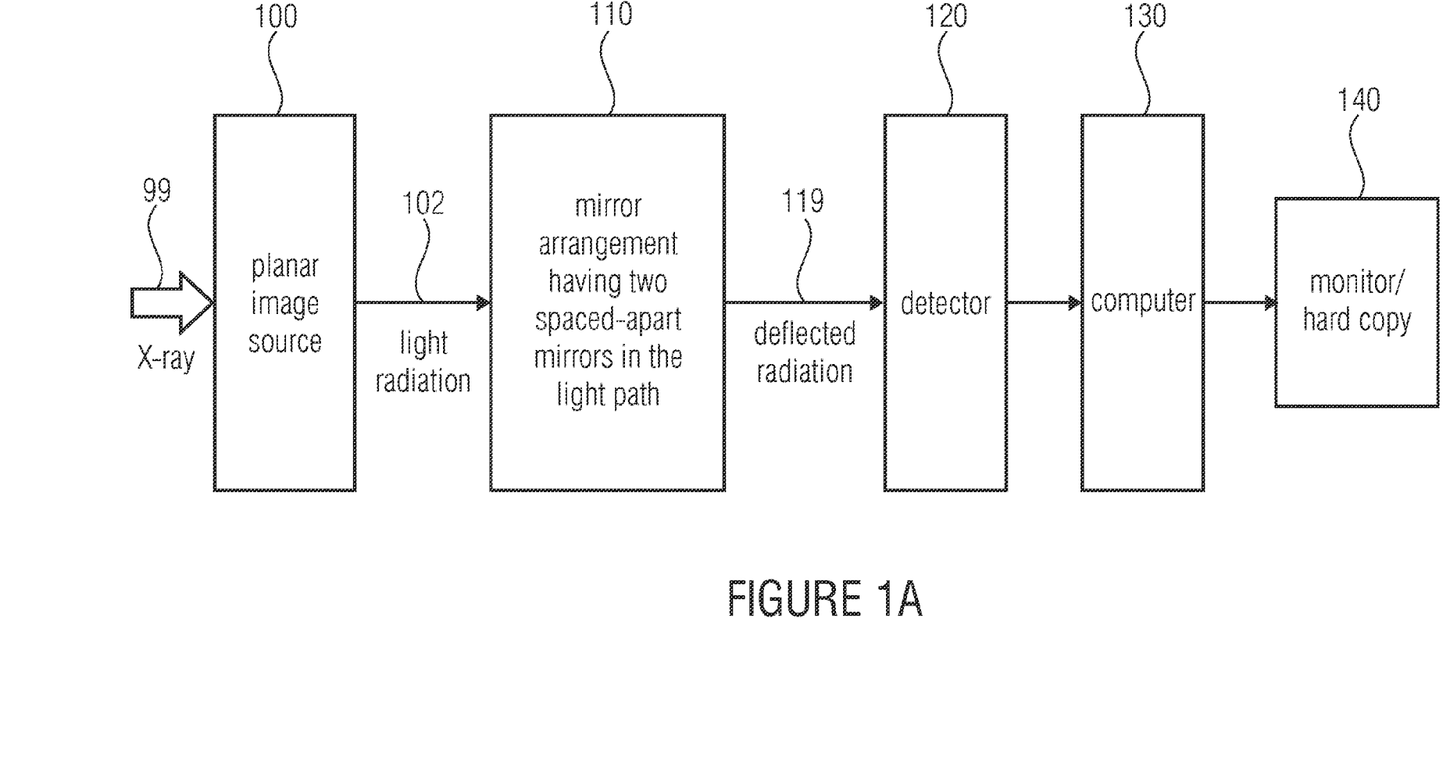
FIG. 1a shows a basic representation of the basic arrangement of the individual elements of the inventive apparatus.

FIG. 1a shows a schematic representation of the apparatus for detecting an image. The apparatus for detecting an image comprises a planar image source 100 and a mirror arrangement 110 for deflecting radiation which may be generated by the image source 100. The light radiation generated by the planar image source 100 is schematically depicted at 102. Thus, the mirror arrangement 110 receives the light radiation 102 at the input side, and outputs deflected light radiation 119 which will impinge on a detector 120. The detector is configured to receive the light, or the radiation, 119 deflected by the mirror arrangement 110. At the output side, the detector 120 may be connected to a computer 130, which outputs the image generated by the planar image source 100 via a monitor or a printer in the form of a printed copy (hard copy) or as a file (soft copy). Therefore, the device 140 may be a memory, a monitor, a printer or, e.g., a communication interface so as to transmit the image to a remotely arranged printer or monitor, so that it will eventually be output there. Alternatively or additionally, composition of the individual images may be followed by an automatic evaluation being performed and by the evaluation result being output. In addition, evaluation may also take place in the form of a computer tomography, i.e. in that a presentation is generated on the basis of sectional images.

Figure 1B:
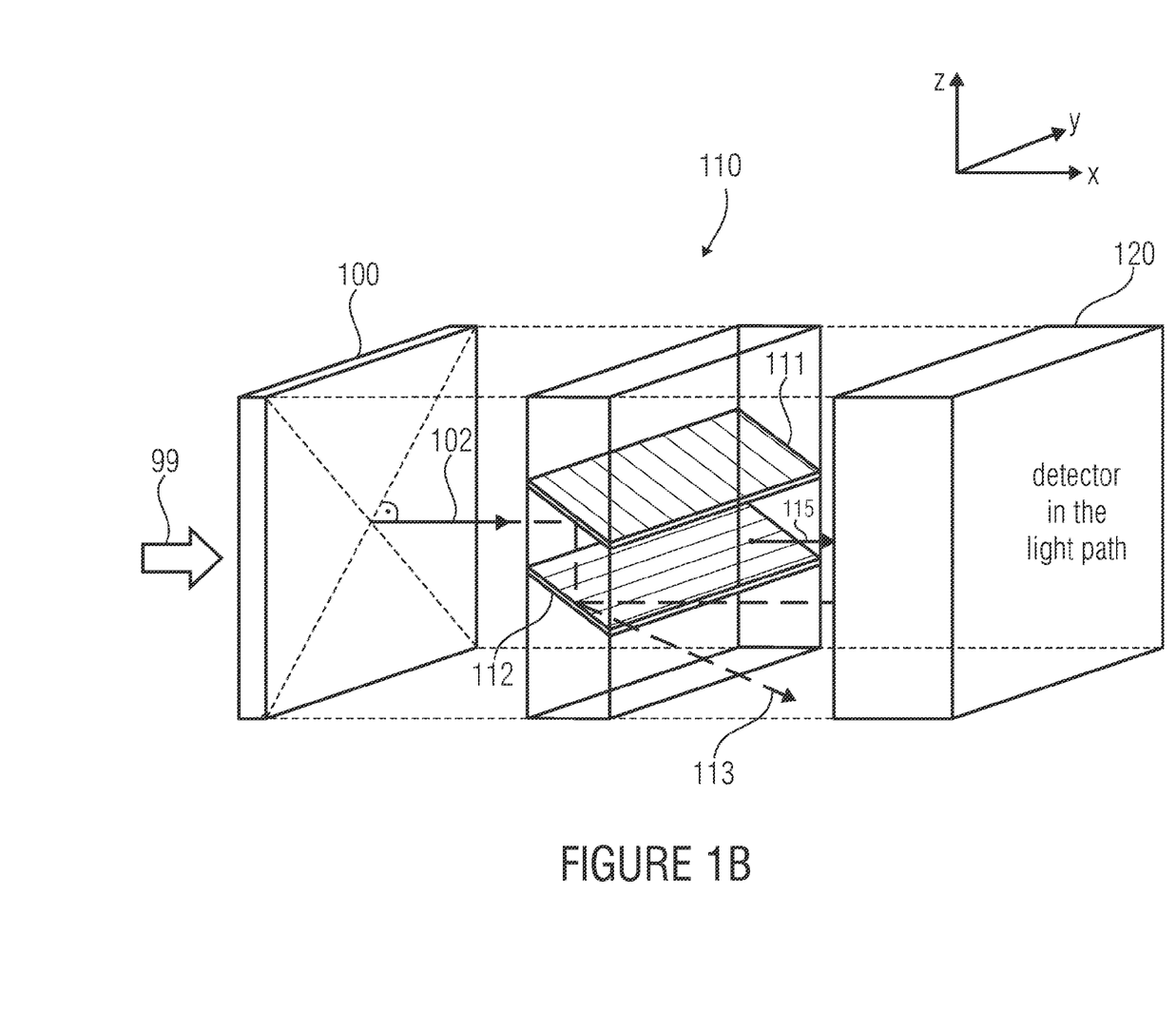
FIG. 1b shows a schematic three-dimensional view of a "sandwich" consisting of a scintillator, a mirror arrangement and a detector.

With reference to FIG. 1b, a specific embodiment of the mirror arrangement 110 shall be addressed below. In particular, the mirror arrangement 110 comprises two spaced-apart mirrors, a first mirror 111 being arranged, in particular, to reflect the light, or the radiation, 102 coming from the planar image source 100. In particular, the first mirror 111 is arranged such that it will not directly reflect back the light, but reflect it to a second mirror 112, the second mirror 112 being arranged to again reflect the light reflected by the first mirror.

As is shown in FIG. 1b, the first and second mirrors 111, 112 are spaced apart from each other and are arranged in parallel with or at an acute angle relative to each other which is smaller than 90°. This ensures that the light reflected by the second mirror 112 is reflected in the direction of the detector 120. For example, the mirror arrangement 110 may also have further mirrors arranged therein which are not shown in FIG. 1b, but which will be addressed later on with reference to FIG. 3, for example. The mirror arrangement is such that the light reflected by the second mirror 112 has at least one component which is directed along the direction from the screen 100 to the detector 120. Therefore, if the mirror 112 were tilted slightly further downward, the light reflected by the second mirror 112 would have a direction, for example, as is drawn in at 113. The radiation 113 therefore has a component which exists in parallel with the vector 102, and additionally has a component which is directed downward in FIG. 1b. To detect such a radiation, the detector 120 in FIG. 1b would have to be arranged slightly further down.

Similarly, the second mirror 112 could be slightly tilted upward as compared to the parallel arrangement of FIG. 1b, so that any radiation emitted by the second mirror 112 would be directed upward in relation to the vector 102. In this case, the detector 120 could also be arranged slightly further up so as to detect this radiation as well. The two mirrors 111, 112 therefore need not necessarily be arranged in parallel, but should be arranged at least such that an acute angle, i.e. of less than 90°, is present between the two mirrors so that the radiation output by the second mirror 112 has at least one component in the direction of the vector 102, which is the normal vector on the planar image source 100. The larger the component, which is parallel to the vector 102, of the radiation output by the second mirror 112, the more compact the configuration of the entire apparatus, including the planar image source 100 and the detector, may be, an angle of between 0 and 80° between the two mirrors being specifically advantageous.

The two mirrors 111, 112 have the advantage that they cover a "line-of-sight connection" between the detector 120 and the planar image source 100, but that nevertheless the light directed from the planar image source 100 to the detector 120 is detectable, i.e. is not shaded by the two mirrors 111, 112.

In particular when the planar image source 100 is a scintillator which is excited by X-radiation 99 on that side which in FIG. 1b is its rear side, what is achieved by this is that the detector 120 is protected from the X-rays 99 despite the fact that it is arranged within the light path. X-rays which pass through the scintillator 100 cannot arrive at the detector directly, but penetrates the two mirrors 111, 112. In typical arrangements, the mirrors 111, 112 are reflective only for such light rays emitted by the scintillator 102 which are within the visible range. However, the X-rays 99 are not reflected, but scattered or absorbed by the mirrors 111, 112.

Thus, the ratio of the intensity of the light radiation 115 to the X-radiation is larger between the mirror arrangement 110 and the detector 120 than between the mirror arrangement 110 and the planar image source 100. This is due to the fact that the X-radiation is attenuated to a greater extent by the mirror arrangement than is the visible (useful) radiation. The detector 120, which, e.g., is a detector on the basis of a semiconductor chip such as a detector having a CCD camera, is therefore protected by the mirror arrangement 110 from the X-radiation 99 which is used for exciting the scintillator 100, so that same will emit the useful radiation 102. Generally, therefore, a radiation having a short wavelength will impinge on the scintillator 100 from the rear side, and the scintillator 100 will emit a radiation 102 having one or several wavelengths which are longer, by a factor of at least 10, than the wavelength of the radiation behind the scintillator, the mirrors 111, 112 having an attenuating effect on the short-wave radiation, and having a reflecting effect on the longer-wave radiation, or having a more intense reflecting effect on the longer-wave radiation than on the short-wave radiation.

The concept depicted in FIGS. 1a and 1b of an apparatus for detecting an image generated by a planar image source, such as a scintillator screen, for example, may advantageously be employed for dividing up the scintillator screen into any number of optical cameras. The advantage of this concept consists in that a scintillator area of any size may be subdivided into a correspondingly large number of optical cameras without changing the structural depth, and in that the dimensions of the X-ray camera will nevertheless correspond, in terms of length and width, to the size of the scintillator screen in terms of length and width, whereas this has not been achieved in conventional technology, since in conventional technology, the optical cameras have been arranged laterally in relation to the scintillator screen. In the present invention, a specific area of the scintillator is advantageously imaged onto each camera, respectively, the areas slightly overlapping so as to be able to depict, following corresponding correction, the entire scintillator area, it being possible for this correction and the composition of the individual images of the individual detector cameras to take place within the computer 130 of FIG. 1a. In this manner, a modular architecture is enabled wherein, in principle, any size and shape of the scintillator may be imaged by adding further modules. In this manner, an X-ray camera may be built which is adapted to the size and shape of the device under test, i.e. of the object X-rayed by the X-radiation 99.

FIG. 1b shows an arrangement comprising two mirrors 111, 112, it also being possible to arrange one or, e.g., more cameras within the detector in the y direction so as to have a row of cameras. Then each individual camera images a subregion of the light 115 output by the mirror 112, this subregion being a subregion in the y direction in FIG. 1b.

Figure 2:
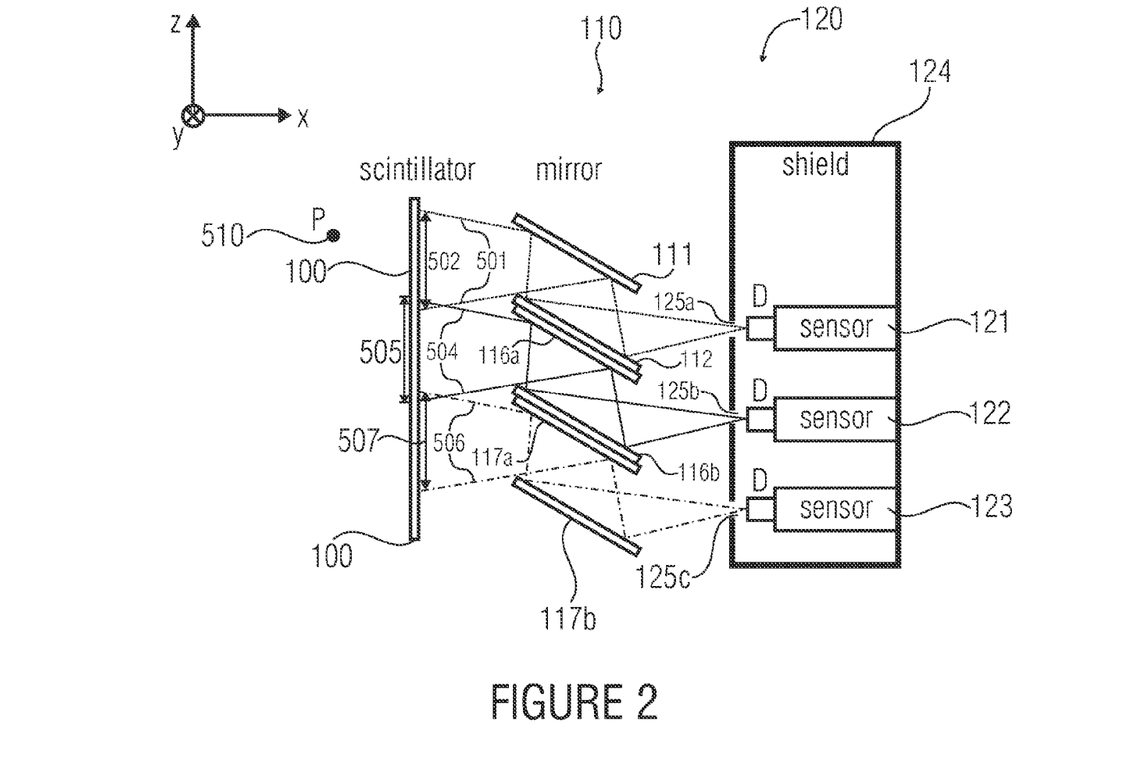
FIG. 2 is a side view of a vertical arrangement having two parallel mirrors, it being possible for any number of cameras to be arranged in rows perpendicularly to the drawing plane.

FIG. 2 shows an alternative arrangement wherein several pairs of mirrors are arranged in the z direction, several sensors also being arranged in the z direction, so as to detect the light reflected by the second mirror of a pair of mirrors in each case. In particular, FIG. 2 shows dashed lines shown at 501 and indicating the region 502 of the scintillator in the z direction, which is detected by the first pair of mirrors 111, 112 and is directed to a first detector camera 121. A second subregion in the z direction, designated by 505, is detected by a second pair of mirrors, which comprises a third mirror 116a and a fourth mirror 116b, and is imaged to a second sensor 122. The imaging "process" is indicated by the continuous lines 504. A fifth mirror 117a and a sixth mirror 117b form a third pair of mirrors, which images a region 507 of the scintillator in the z direction, the imaging process being indicated by the dashdotted lines 506 so as to image this region 507 to the third sensor, or the third sensor camera, 123. Thus, the detector 120 comprises three detector cameras 121, 122, 123, in which context it should be noted that in the y direction, it is not absolutely necessary for there to be one single detector camera, but that typically several detector cameras may be present, such that the detector 120 comprises an array of detector cameras, the individual images of the detector cameras being composed by the computer 130 to form an overall image.

In addition, FIG. 2 indicates that the regions of the scintillator which are imaged to a camera by a pair of mirrors, or which are imaged to a row of cameras, respectively, will slightly overlap. The overlap results from the overlap of the region 502 with the region 505 and from the overlap of the region 505 with the region 507.

In FIG. 2, all six mirrors are arranged in parallel with one another, the mirror 116a being arranged on the rear side of the mirror 112. The same applies to the fourth mirror 116b and the fifth mirror 117a. Again, both mirrors are arranged such that their rear sides abut on each other. A specific implementation for the element having the second mirror 112 and the third mirror 116a consists in that a support is provided which is mirrored on its top surface so as to form the mirror 112, and which is also mirrored on its bottom surface so as to form the mirror 116a. This mirroring may be achieved by a specific surface treatment or surface coating of the support. The support for the fourth mirror 116b and for the fifth mirror 117a may be implemented in a similar manner, i.e. such that the top and bottom surfaces are treated or coated accordingly so as to implement the mirrors 116b, 117a.

In accordance with the invention, in the embodiment depicted in FIG. 2 the scintillator screen is imaged to several optical cameras in such a manner that only the visible light emanating from the scintillator will impinge on the optical cameras, and that any X-radiation which may pass through the scintillator will not be able to cause any radiation damage in the sensors 121, 122, 123. For this purpose, two mirrors 111, 112, and 116a, 116b, and 117a, 117b, respectively, are arranged in parallel with one another within the light path of each camera, as is shown in FIG. 2, in such a manner that the visible light emanating from a subarea of the scintillator reaches the camera, but such that no direct "open" path to the camera exists for X-radiation. Rather, the direct X-radiation crosses, on its way to the camera, at least one of the mirrors, or, as will be set forth below, double-mirror arrangements. For scattered X-radiation, the conditions are different, but scattered X-radiation is weaker than direct radiation.

To intensify the weakening of the X-radiation on its way through the mirrors even more, it is advantageous to provide the mirrors with a sufficiently thick absorber layer, such as lead, for example, on their rear sides in order to effectively weaken the X-radiation. As may be seen from FIG. 2, a double mirror, or a support mirrored on both sides may be used instead of an individual mirror for such camera arrangements which are not located at the edge, in order to periodically continue the arrangement. In one embodiment, this support is formed from a material having a high level of absorptive power for X-radiation, and having sufficient mechanical stability. Such a material is tungsten or lead, for example. Alternatively, an absorber layer which is designed accordingly and is made of lead, for example, may be arranged between the two mirrors of the double-mirror arrangement, i.e. between the mirrors 112, 116a, and 116b and 117a, respectively.

To have increased protection from scattered radiation, it is also advantageous to shield the detector arrangement 120, as is shown at 124 in FIG. 2. The shield 124 may be a lead shield or any other shield which attenuates X-rays. Only regions 125a, 125b, 125c, at which visible radiation may enter into the shield 124, are open, or are transparent to optical radiation, whereas transparence to optical radiation outside these regions is not necessary and is not implemented, since X-ray shields may be implemented at low cost when they do not have to be optically transparent.

Depending on the beam direction, i.e. on the position of the X-ray source in relation to the midperpendicular of the scintillator, however, with the double-mirror arrangement there are, for X-radiation, direct open paths to an optical camera. Specifically, if the X-radiation is arranged, e.g., at a position P510, X-rays exiting at the position P510 may enter into the sensor 123 without these X-rays having been attenuated by a double-mirror arrangement. To prevent the sensor 123 from being damaged, it is advantageous to avoid this direct path. One manner to avoid this direct path consists in not allowing any arrangements to exist between the X-ray source and the scintillator, but in allowing only arrangements of the X-ray source behind a central region of the scintillator, which region may be the region 505, for example.

However, to have a more variable possibility of arranging the X-ray source in relation to the scintillator, and also to be safer from scattered radiation—the scattered radiation being considerably less intense than the X-ray intensity existing between the scintillator and the mirror arrangement—the embodiment shown in FIG. 2 provides the shield 124 which is interrupted (125a, 125b, 125c) only where this is useful for optical imaging. At the places where the shield housing is interrupted for optical radiation, shielding from X-rays is additionally performed in that, advantageously, a specific glass is arranged within the optical light path which is transparent to visible light, but strongly absorbs X-radiation. Such a glass is lead glass, for example.

A further possibility of shielding consists in that the optics of the sensor cameras 121, 122, 123 are manufactured from a corresponding special glass, such as lead glass, for example, so that the imaging optics will absorb X-radiation, but will be transparent to visible light. Depending on the implementation, this approach may be disadvantageous, however, since currently available special glass having a high level of X-ray absorptive power also absorbs some visible light. However, if the intensities of the visible light emitted by the scintillator are sufficiently large, the radiation detected by the detector cameras will be sufficient to generate an image having a sufficient signal/noise ratio.

Figure 3:
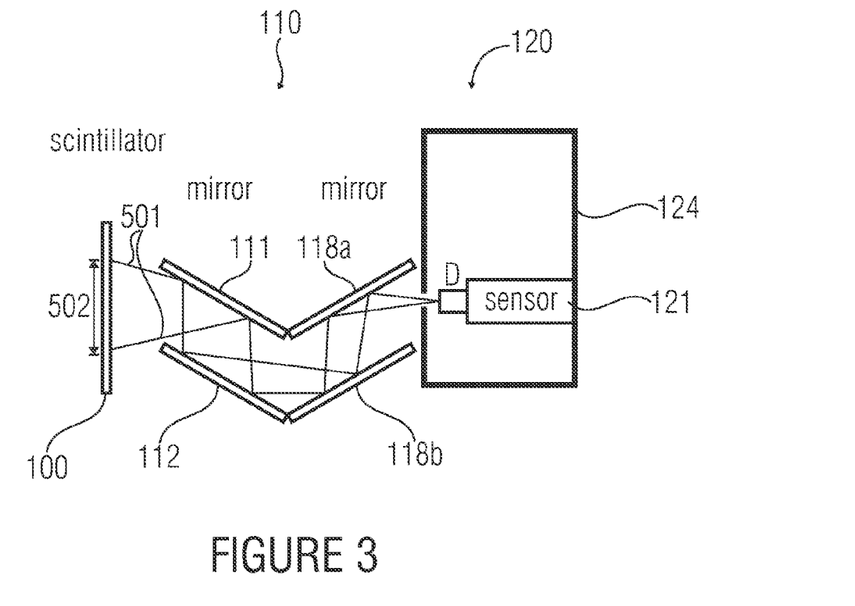
FIG. 3 is a side view of a 2×2 parallel mirror arrangement, it being possible again for any number of cameras to be arranged in rows perpendicularly to the drawing plane.

A further implementation for reducing X-radiation in accordance with the double-mirror arrangement is shown in FIG. 3. A further pair of mirrors 118a, 118b is arranged, the first mirror 118a of the further pair of mirrors being arranged to deflect the light reflected by the second mirror 112 of the mirror arrangement, and the second mirror 118b of the further pair of mirrors being arranged to deflect the light, which is deflected by the first mirror 118a of the further pair of mirrors, in the direction of the detector 121. Thus, one or several further double-mirror arrangements, not shown in FIG. 3, are placed into the optical light path. As a result, for random arrangements of the X-ray source, with regard to the camera, there is not longer any direct path from the sensor to an X-ray source arranged before the scintillator screen.

This is due to the fact that the two mirror arrangements cover direct paths from the X-ray source located behind the scintillator screen to the active detector regions, which is achieved, for example, in that the first mirror 111 and the first mirror 118a of the further pair of mirrors contact each other, and that the second mirror 112 and the second mirror 118b of the further mirror arrangement also contact each other. Even if the two mirrors do not contact each other, a shield may be arranged within the region where the mirrors are not required for reflection, such that no direct path is possible from an X-ray source located behind the scintillator 100 without any intermediate shield to the sensor 121. As in FIG. 2, the arrangement shown in FIG. 3 may be continued as desired in the upward direction, i.e. in the z direction, as well as in the y direction, i.e. in the direction vertical to the drawing plane. Since the X-radiation may now reach a camera only following multiple scattering processes, its intensity is considerably reduced in this arrangement as compared to a simple double-mirror arrangement. Depending on the implementation, the further shielding measures as were described in connection with FIG. 2 and which are not absolutely necessary in this arrangement may also be additionally implemented.

Figure 4:
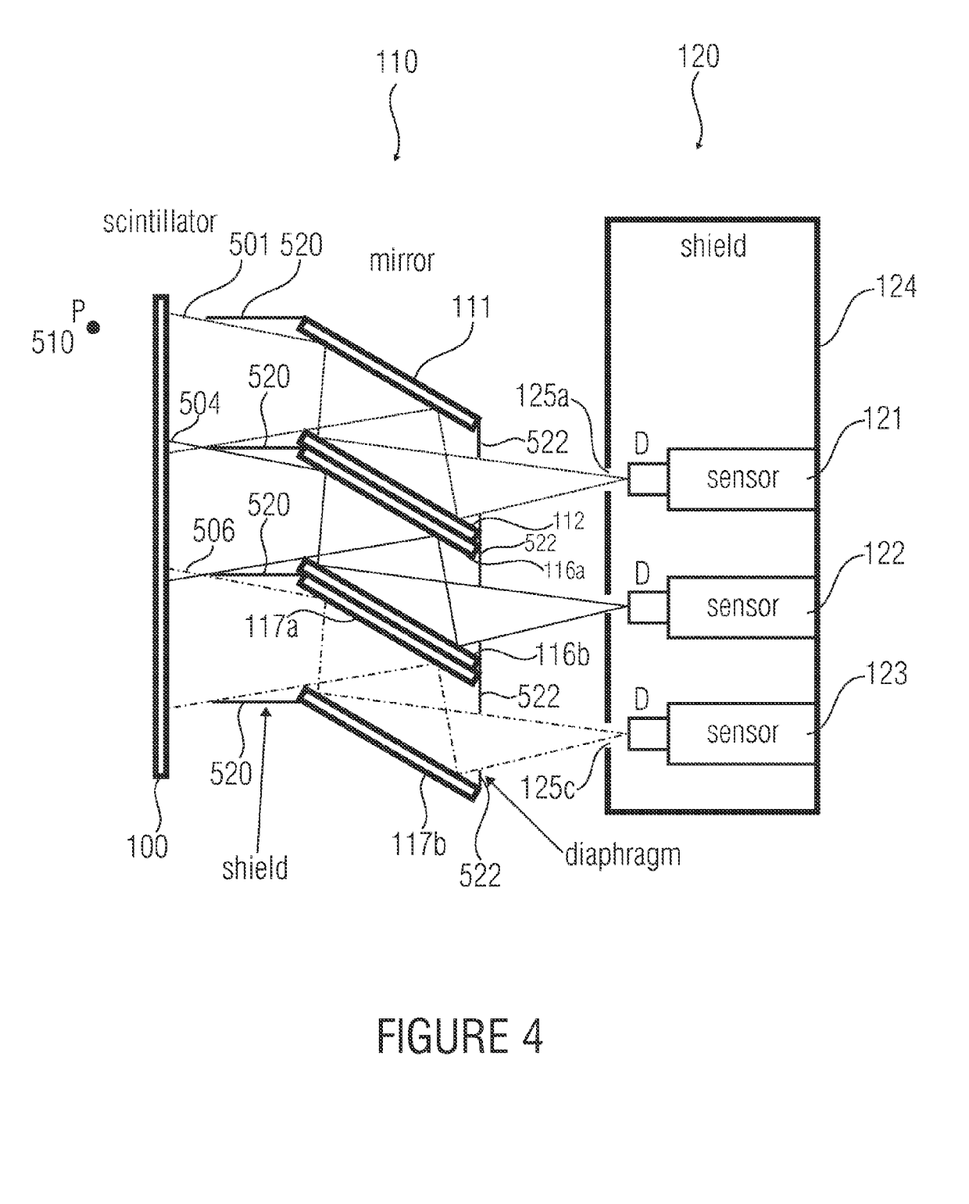
FIG. 4 is a side view of a vertical arrangement having two parallel mirrors and diaphragms/shields for reducing scattered X-radiation and/or the aperture angle for direct radiation, it being possible again for any number of cameras to be arranged in rows perpendicularly to the drawing plane.

A further embodiment for reducing X-radiation is shown in FIG. 4. Shields 520, or diaphragms 522, are provided before the first mirror and/or behind the second mirror. In particular, shields 520 are provided on the mirror side facing the scintillator 100, and/or diaphragms 522 are provided on the mirror side facing the detector 120. Preferably, the shields 520 and the diaphragms 522 are made of a material which absorbs X-rays, such as lead. An alternative material to lead may also be provided as long as it has an X-ray absorbing effect, such as tungsten, for example. FIG. 4 shows the arrangement of the shields and/or diaphragms with regard to the light paths 501, 504, 506. It may be seen that the light paths 501, 504, 506 are not impaired by the shields 520 and the diaphragms 522. Some of the scattered X-radiation which might get from the diaphragms to the first mirror is absorbed in this manner. In addition, the range of angles from which X-radiation would directly impinge on a camera is reduced. For example, the direct path of the X-radiation source at the point P510 to the lower sensor 123 is effectively interrupted by the second shield 520.

It shall be noted that the specifically shielded arrangement shown in FIG. 4 which comprises the shields 520 and the diaphragms 522 (it being possible, in specific arrangements, for either diaphragms 522 or shields 520 to suffice) is advantageous with regard to a compact design. The reason for this is that in this case, there is a large region wherein the X-ray source may be arranged in relation to the scintillator 100 without there being a direct open path to one or more optical cameras. In particular, the arrangement shown in FIG. 4 will be sufficient when the X-ray source is arranged at a sufficiently large distance along the midperpendicular of the scintillator screen, which is typical of most technical applications. If, in the embodiment shown in FIG. 4, a special glass may additionally be used for absorbing the X-rays in the regions 125a, 125b, 125c or in the optics of the sensor cameras, however, the absorption effected by this special glass may be disadvantageous as compared to the arrangement depicted in FIG. 3, which may dispense with such a special glass. Specifically, many special glasses have the disadvantage that over time they develop an increased level of attenuation since they exhibit a "browning effect" due to the X-radiation.

This will be the case, in particular, when the reflection losses caused by the double-mirror arrangement are smaller than the losses caused by the special glass, and when the structural depth, which is larger in FIG. 3, does not prohibit utilization of such a camera. Therefore, one may have to weigh up the optical absorption of the arrangement shown in FIG. 4, including special glass for absorbing the X-radiation, and the reflection losses of a further double-mirror arrangement in accordance with FIG. 3. With a very high radiation energy, an arrangement of FIG. 3 may therefore be advantageous.

In an inventive method of detecting an image, radiation is initially emitted by a planar image source, which radiation is then deflected within the mirror arrangement and detected within the detector, the two mirrors 111, 112 being utilized in the deflection, and these mirrors being spaced apart such that they are parallel with each other or form an angle of less than 90° between them. For manufacturing such an apparatus, an image source, a detector and a mirror arrangement are therefore arranged such that they face one another, the two mirrors 111, 112 being arranged in parallel with each other or arranged at an angle of less than 90° between them, so that the light 115 reflected by the second mirror 112 will be parallel to the light 102 reflected by the planar image source, or will have at least one component which extends in parallel with the direction designated by the vector 102.

The computer 130 is configured to compose the individual images into an overall image. This composing process advantageously takes place following an analog/digital conversion. In addition it is advantageous to perform a corresponding correction on the basis of the overlap regions, these overlap regions existing both in the z direction, as is shown by way of example in FIG. 2, and in the y direction if several sensors image a mirror, even though this overlap region is not drawn in FIG. 2. In addition, the computer may be configured to correct optical distortions or other artifacts which are detected during calibration of the apparatus and are then computationally compensated for during operation.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. An apparatus for detecting an image, comprising:
   an image source;
   a mirror arrangement for deflecting radiation which may be generated by the image source; and
   a detector for receiving radiation deflected by the mirror arrangement,
   the mirror arrangement comprising:
      a first mirror arranged to reflect the radiation generated by the image source;
      a second mirror arranged to reflect radiation reflected by the first mirror,
   the first mirror and the second mirror being spaced apart from one another and being parallel to one another or forming an angle of less than 90° between them, and
      a third mirror and a fourth mirror, the first mirror being arranged to reflect only such radiation to a sensitive detector region which comes from a first subregion of the image source,
      the third mirror being arranged to reflect only such radiation to a sensitive detector region which comes from a second subregion of the image source, the first subregion differing from the second subregion,
      the fourth mirror) being arranged to reflect radiation reflected by the third mirror, the third mirror being arranged on a rear side of the second mirror, and
      an X-ray absorber material being arranged between the second mirror and the third mirror, or
      the second mirror and the third mirror being configured on different sides of a support material absorbing X-rays.

2. The apparatus as claimed in claim 1,
wherein the image source comprises a scintillator layer which is excitable by an X-radiation for emitting the radiation,
wherein the detector is arranged within a light path of the X-radiation, and
wherein the mirror arrangement is configured to shield at least some X-radiation which penetrates the one scintillator layer from the detector such that X-radiation which passes through the scintillator layer cannot arrive directly at the detector, but passes through the first mirror and the second mirror and is at least weakened in the process, such that the detector is protected from X-radiation by the mirror arrangement.

3. The apparatus as claimed in claim 1,
wherein the detector comprises several detector cameras, wherein the mirror arrangement comprises several pairs of mirrors, each pair of mirrors comprising a detector camera each comprising a sensitive detector region associated with it, and the detector further being coupled to a computer configured to join together images recorded by the detector cameras so as to acquire the image.

4. The apparatus as claimed in claim 1, wherein the first mirror and the second mirror are arranged such that a direction of the radiation reflected by the second mirror to the radiation impinging on the first mirror comprises an angle of between 0 and 80°.

5. The apparatus as claimed in claim 1, wherein the first mirror and the second mirror are arranged such that at least one mirror is arranged on a shortest connecting line between the detector and the image source, so that a radiation which propagates in the direction of the shortest connecting line impinges on the at least one mirror.

6. The apparatus as claimed in claim 1, wherein the image source comprises a scintillator layer configured to generate the radiation in response to incidence of X-rays, the radiation comprising one or more wavelengths which are detectable by the detector.

7. The apparatus as claimed in claim 1, wherein the first mirror and the second mirror are arranged such that the radiation deflected by the mirror arrangement is deflected in a direction which is parallel to a normal to surface of the image source, or which forms an angle of less than 80° with the normal to surface.

8. The apparatus as claimed in claim 3, further comprising:
a fifth mirror and a sixth mirror, the fifth mirror and the sixth mirror being configured to image only a third subregion of the image source to a sensor.

9. The apparatus as claimed in claim 8, wherein the fifth mirror is arranged on a rear side of the fourth mirror, an X-ray absorber material being arranged between the fifth mirror and the fourth mirror, or the fifth mirror and the fourth mirror being configured on different sides of a support material absorbing X-rays.

10. The apparatus as claimed in claim 1, wherein the detector is arranged, in the direction of radiation, opposite the image source.

11. The apparatus as claimed in claim 1, wherein the mirror arrangement comprises several pairs of mirrors, each pair of mirrors comprising a detector camera associated with it, the detector further being coupled to a computer configured to join together images recorded by the detector cameras so as to acquire the image.

12. The apparatus as claimed in claim 1, wherein a pair of mirrors comprises several detector cameras associated with it, so that there is a detector camera array which comprises a number of array columns equal to the number of detectors associated with a pair of mirrors and wherein a number of array rows is equal to a number of pairs of mirrors, wherein the number of pairs of mirrors can be 1 or larger than 1,
the detector being coupled to a computer configured to join together images recorded by the detector cameras so as to acquire the image.

13. The apparatus as claimed in claim 1, wherein the mirror arrangement further comprises:
a further pair of mirrors, wherein a first mirror of the further pair of mirrors is arranged to deflect light reflected by the second mirror, and wherein another, second mirror is arranged to deflect light, which is deflected by the one mirror of the further pair of mirrors, in the direction of the detector.

14. The apparatus as claimed in claim 1, accommodated within a housing, the size of which, perpendicular to a normal of the image source, is smaller than 1.2 times a corresponding size of the image source.

15. The apparatus as claimed in claim 1, wherein the mirror arrangement is configured to absorb or to scatter at least some of the impinging X-radiation, so that the X-radiation is attenuated in intensity by at least 20% by the mirror arrangement.

16. The apparatus as claimed in claim 1, wherein the first mirror and the second mirror comprise an X-ray absorber layer.

17. The apparatus as claimed in claim 1, wherein the detector is surrounded by an X-ray shield configured to shield the detector where the radiation deflected by the mirror arrangement does not enter into the detector.

18. The apparatus as claimed in claim 1, wherein a location of the detector at which the deflected radiation enters comprises a shielding glass which absorbs X-rays to a greater extent than the deflected radiation.

19. The apparatus as claimed in claim 1, wherein the detector comprises a detector camera which comprises an optics arrangement configured to absorb X-rays to a greater extent than the deflected radiation.

20. The apparatus as claimed in claim 1, wherein the mirror arrangement comprises X-ray absorbing diaphragms in locations which are not imaged by a detector camera, or which are imaged by the detector camera but are eliminated during image post-processing.

21. The apparatus as claimed in claim 1, wherein the mirror arrangement comprises X-ray absorbing shields in locations which do not lie within a detected light path from the image source to the first mirror, or which lie within a detected light path from the light source to the first mirror and are eliminated during subsequent image processing.

22. A method of detecting an image, comprising:
emitting a radiation which represents an image;
deflecting the radiation using a mirror arrangement so as to acquire deflected radiation; and
detecting the deflected radiation so as to acquire the image,
during deflecting, the radiation being reflected by a first mirror, and the radiation reflected by the first mirror being deflected by a second mirror, the first mirror and the second mirror being spaced apart from each other and being parallel to each other or forming an angle of less than 90° between them, and the mirror arrangement further comprising:
a third mirror and a fourth mirror, the first mirror being arranged to reflect only such radiation to a sensitive detector region which comes from a first subregion of the image source,
the third mirror being arranged to reflect only such radiation to a sensitive detector region which comes from a second subregion (505) of the image source, the first subregion (502) differing from the second subregion (505), the fourth mirror being arranged to reflect radiation reflected by the third mirror, the third mirror being arranged on a rear side of the second mirror, and an X-ray absorber material being arranged between the second mirror and the third mirror, or the second mirror and the third mirror being configured on different sides of a support material absorbing X-rays.

23. The method as claimed in claim 22, wherein during emitting, a scintillator layer is excited by X-radiation so as to generate the emitted radiation, and wherein during deflecting, shielding of the X-radiation from the detector is conducted such that X-radiation passing through the scintillator layer cannot arrive at the detector directly, but passes through the first mirror and the second mirror and is at least weakened in the process, such that the detector is protected from X-radiation by the mirror arrangement.

24. A method of manufacturing an apparatus comprising an image source, a mirror arrangement for deflecting radiation which may be generated by the image source, and a detector for receiving radiation deflected by the mirror arrangement, the method comprising:

arranging a first mirror to reflect radiation emitted by the image source; and arranging a second mirror to reflect radiation reflected by the first mirror, and arranging a third mirror and a fourth mirror, the first mirror being arranged to reflect only such radiation onto a sensitive detector region which comes from a first subregion of the image source, the third mirror being arranged to reflect only such radiation onto a sensitive detector region which comes from a second subregion of the image source, the first subregion differing from the second subregion, the fourth mirror being arranged to reflect radiation reflected by the third mirror, the third mirror being arranged on a rear side of the second mirror, and arranging an X-ray absorber material between the second mirror and the third mirror, or configuring the second mirror and the third mirror on different sides of a support material absorbing X-rays.

* * * * *